United States Patent
Park

(10) Patent No.: US 7,292,859 B2
(45) Date of Patent: Nov. 6, 2007

(54) APPARATUS AND METHOD FOR MANAGING DEVICE INFORMATION THROUGH NETWORKS

(75) Inventor: In-ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 632 days.

(21) Appl. No.: 10/802,872

(22) Filed: Mar. 18, 2004

(65) Prior Publication Data

US 2004/0184431 A1    Sep. 23, 2004

(30) Foreign Application Priority Data

Mar. 19, 2003    (KR) ...................... 10-2003-0017145

(51) Int. Cl.
*H04Q 7/20* (2006.01)
(52) U.S. Cl. ............... 455/445; 370/346; 707/104.1; 709/201
(58) Field of Classification Search ............. 370/346, 370/449; 709/201; 707/104; 455/455
See application file for complete search history.

(56) References Cited

U.S. PATENT DOCUMENTS 6,029,175 A * 2/2000 Chow et al. ............. 707/104.1
6,370,381 B1 * 4/2002 Minnick et al. ........... 455/445
2004/0098447 A1 * 5/2004 Verbeke et al. ........... 709/201
2004/0184431 A1 * 9/2004 Park ...................... 370/346

FOREIGN PATENT DOCUMENTS

| JP | 10-161880 A | 6/1998 |
|----|-------------|--------|
| JP | 2002-44765 A | 2/2002 |
| JP | 2003-006070 A | 1/2003 |
| JP | 2003-008585 A | 1/2003 |

* cited by examiner

Primary Examiner—William D. Cumming
(74) Attorney, Agent, or Firm—Sughrue Mion Pllc.

(57) ABSTRACT

An apparatus and method for managing device information through networks. The apparatus for managing device information through networks includes a polling list for storing polling information including device IP addresses assigned to home devices, polling intervals, and last polling times; a poller for checking the polling list and sending out a polling list listing devices to be polled; and a message processor for generating a polling message based on received registration request messages from the home devices, sending out the polling message verifying whether corresponding devices are activated with reference to the polling list, and updating the polling information stored in the polling list based on a response message with respect to the polling message received from the home devices. As different polling intervals are used with respect to devices existing on a home network, the reliability of device information improves and network traffic reduces.

18 Claims, 8 Drawing Sheets

APPARATUS AND METHOD FOR MANAGING DEVICE INFORMATION THROUGH NETWORKS

CROSS-REFERENCE TO RELATED APPLICATIONS

This application claims the priority of Korean Patent Application No. 2003-17145, filed Mar. 19, 2003, in the Korean Intellectual Property Office, the disclosure of which is incorporated herein by reference.

BACKGROUND

1. Field of the Invention

The present invention relates to apparatus and method for managing device information through networks, and more particularly, to apparatuses and methods for managing device information through networks, capable of maintaining reliable information on home devices while reducing data traffic in a home network.

2. Description of the Related Art

A home network provides paths that enable digital home appliances to send data to and receive data from one another, and, at the same time, provides connections to external communication networks to enable intelligent communications, to thereby ultimately maximize the sharing of information resources and the utilizing of individual appliances at home through such networks.

There are information-related devices such as personal computers, facsimiles, and so on, A/V devices such as TVs, set-top boxes, DVDs, and so on, control-based devices such as coffee makers, rice cookers, refrigerators, and so on, dummy devices such as remote controllers, interphones, and so on, and the like, that are home appliances connected to a home network. Such home appliances can connect to sub-networks such as telephone lines, wireless LANs, BLUETOOTH networks, Universal Serial Buses (USBs), IEEE 1394, electric power lines, and so on.

FIG. 1 is a view for showing a structure of a general home network.

Referring to FIG. 1, an independent network is constructed with a telephone set 120a, a notebook computer 120b, a facsimile 120c, and a computer 120d connected to telephone lines 120. A notebook computer 130a and a PDA 130b are connected to a wireless LAN or a BLUETOOTH network 130. An USB network 140 includes a computer 140a, a printer 140b, and a scanner 140c. An IEEE 1394 network 150 includes AV devices such as a TV 150a, a camcorder 150b, an audio set 150c, and the like. To electric power lines 160 are connected control-based appliances such as a coffee maker 160a, a rice cooker 160b, a refrigerator 160c, and a washing machine 160d. These sub-networks 120, 130, 140, 150, and 160 are interconnected by a node 170 as a bridge port. A master server 110 serves as a path interconnecting external networks and devices existing in these sub-networks.

However, the conventional home network 100 is mixed with existing networks such as telephone lines, electric power lines, and so on, and newly established networks such as a BLUETOOTH network, a wireless LAN, and so on, and devices in the networks operate on different hardware and software platforms, so that it is not easy to construct a home network in a single system. Accordingly, a method has been proposed in that a common virtual computing environment called "middleware" is configured, as a home network implementation approach, for devices scattered at home, and applications are provided over the environment.

The middleware is software for communications among devices belonging to different categories, enabling communications among various kinds of devices over a home network. The middleware is deployed between an operating system and application programs, and transparently connects distributed applications and data in a client/server environment.

Recently, diverse middleware structures have been proposed for a home network. Of the structures, the typical structures are (1) a control structure using a peer-to-peer architecture, (2) a control structure using an executable object transfer method in view of distributed environments, (3) a control structure using specific network media functions, and so on. However, the structures (1) and (2) can control devices, but have difficulties in embedding control functions over an entire home network therein. Further, the structure (3) is a structure for home sub-network services over specific devices rather than home network services over all devices at home.

In the meantime, such middleware structures cannot provide services through the Internet only by their functions. Therefore, if the middleware structures are employed, a conversion device or a conversion software is required to convert data structures somewhere on the way in order to provide services through the Internet. However, such a conversion device or a conversion software provides only communication functions through the Internet. Accordingly, a problem occurs in that it is impossible to provide home network information or information on devices existing on a home network to user devices connected to the Internet and to provide services requested by the user devices based on the information.

In order to solve the problem, the Applicant has filed a Patent application entitled "Apparatus and method for providing device information through networks" in Republic of Korea Patent Application No. 2002-13168. The Patent application discloses an apparatus and a method for providing a unit for controlling home devices existing on a home network and a control unit among the devices and also providing to a user device information on the devices existing on the home network.

However, the apparatus and method previously proposed in the Patent application have a problem in that data traffic increases since polling messages are periodically sent to check the states of home devices, and there exists a limitation in updating device information with reliable up-to-date information due to the lack of self-recovering functions and the like.

SUMMARY

The present invention has been devised to solve the above problems, so it is an aspect of the present invention to provide an apparatus and a method for managing device information through networks, capable of providing different polling intervals based on the characteristics of devices existing on a home network, providing self-recovering functions, and updating device information with reliable up-to-date information.

In order to achieve the above aspect, an apparatus for managing device information through networks comprises a polling list for storing polling information including device IP addresses, assigned to home devices, polling intervals, and last polling times; a poller for checking the polling list and sending out a polling list listing devices to be polled; and a message processor for generating a polling message based on received registration request messages from the home devices, sending out the polling message verifying whether corresponding devices are activated with reference to the polling list, and updating the polling information stored in the polling list based on a response message with respect to the polling message received from the home devices.

Preferably, but not necessarily, the message processor further generates the device information including at least any of basic information on the home devices, a service list, and a state variable list, based on the registration request messages, and updates the device information based on the response message as to the polling message.

Preferably, but not necessarily, the apparatus further comprises a database for databasing and storing the device information; a database processor for performing transactions on the device information stored in the database; and a page generator for generating and providing to the message processor the device information in a web page format based on the device information received from the database processor in response to information requests on the home devices.

Preferably, but not necessarily, the page generator generates the device information in the web format when there is no need to send out the polling message with respect to the corresponding devices in response to the information requests and when the response message of the corresponding device with respect to the polling message is normal. In an exemplary embodiment, when a difference between a last polling time and an information request time with respect to the corresponding device is smaller than a predetermined time, there is no need to send out the polling message.

Preferably, but not necessarily, the apparatus further comprises a data processor for receiving and providing to the message processor additional information including at least one of location information on the home devices and identification information, wherein the message processor requests the data processor to provide the additional information if the message processor receives the registration request message from the home devices.

Further, the message processor preferably, but not necessarily, multicasts a message requesting the home devices to send out the registration request messages at an initial operation, and, when receiving a connection termination message from the home devices, requests the poller and the database processor to delete the polling information and device information on the corresponding device.

Moreover, the device information preferably, but not necessarily, includes device kind information having at least one of device type, serial number, and manufacturer, and device IP addresses assigned to the home devices.

In the meantime, a method for managing device information through networks comprises steps of (a) generating polling information including device IP addresses assigned to home devices, polling intervals, and last polling times based on registration request messages received from the home devices; (b) storing the polling information; (c) checking a polling list and sending out a polling list listing devices to be polled; and (d) sending out a polling message verifying whether corresponding devices are activated with reference to the polling list, and updating the polling information stored in the polling list based on response messages received from the home devices with respect to the polling message.

Preferably, but not necessarily, the method further comprises steps of generating the device information including at least any of basic information on the home devices, a service list, and a state variable list, based on the registration request messages; and updating the device information based on the response message to the polling message.

Further, the method further comprises steps of databasing and storing the device information; performing transactions on the device information stored in the database; and generating and providing the device information in a web page format based on the device information received from the step for performing the transactions in response to information requests on the home devices.

Preferably, but not necessarily, the step for generating the device information in the web format generates the device information in the web page format, when there is no need to send out the polling message with respect to the corresponding devices in response to the information requests and when the response message of the corresponding device with respect to the polling message is normal. Here, preferably, but not necessarily, when a difference between a last polling time and an information request time with respect to the corresponding device is smaller than a predetermined time, there is no need to send out the polling message.

Preferably, but not necessarily, the method further comprises steps of receiving and providing additional information including at least any of location information on the home devices and identification information from a user upon registering the home devices; and requesting the providing of the additional information if the registration request message is received from the home devices.

Further, in an exemplary embodiment, the method further comprises steps of multicasting a message requesting the home devices to send out the registration request messages at an initial operation, and deleting the polling information and the device information on corresponding devices when receiving a connection termination message from the home devices.

Further, the device information includes device kind information having at least one of device type, serial number, and manufacturer, and device IP addresses assigned to the home devices.

BRIEF DESCRIPTION OF THE DRAWINGS

The invention will be described in detail with reference to the following drawings in which like reference numerals refer to like elements, and wherein.

DETAILED DESCRIPTION OF THE EXEMPLARY EMBODIMENTS

Hereinafter, the present invention will be described in detail with reference to the accompanying drawings.

Figure 1:
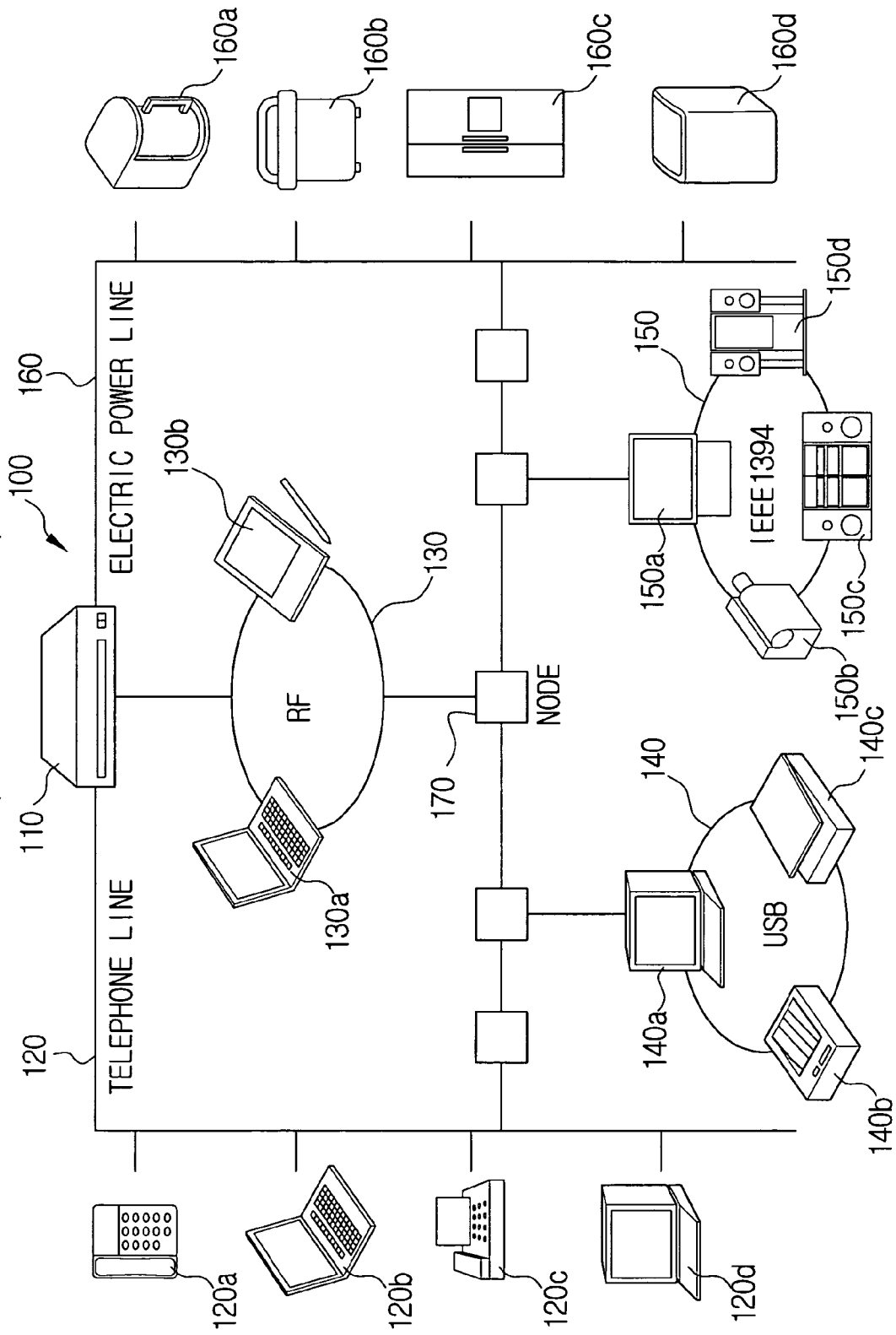
FIG. 1 is a view for showing a general home network structure.
Figure 2:
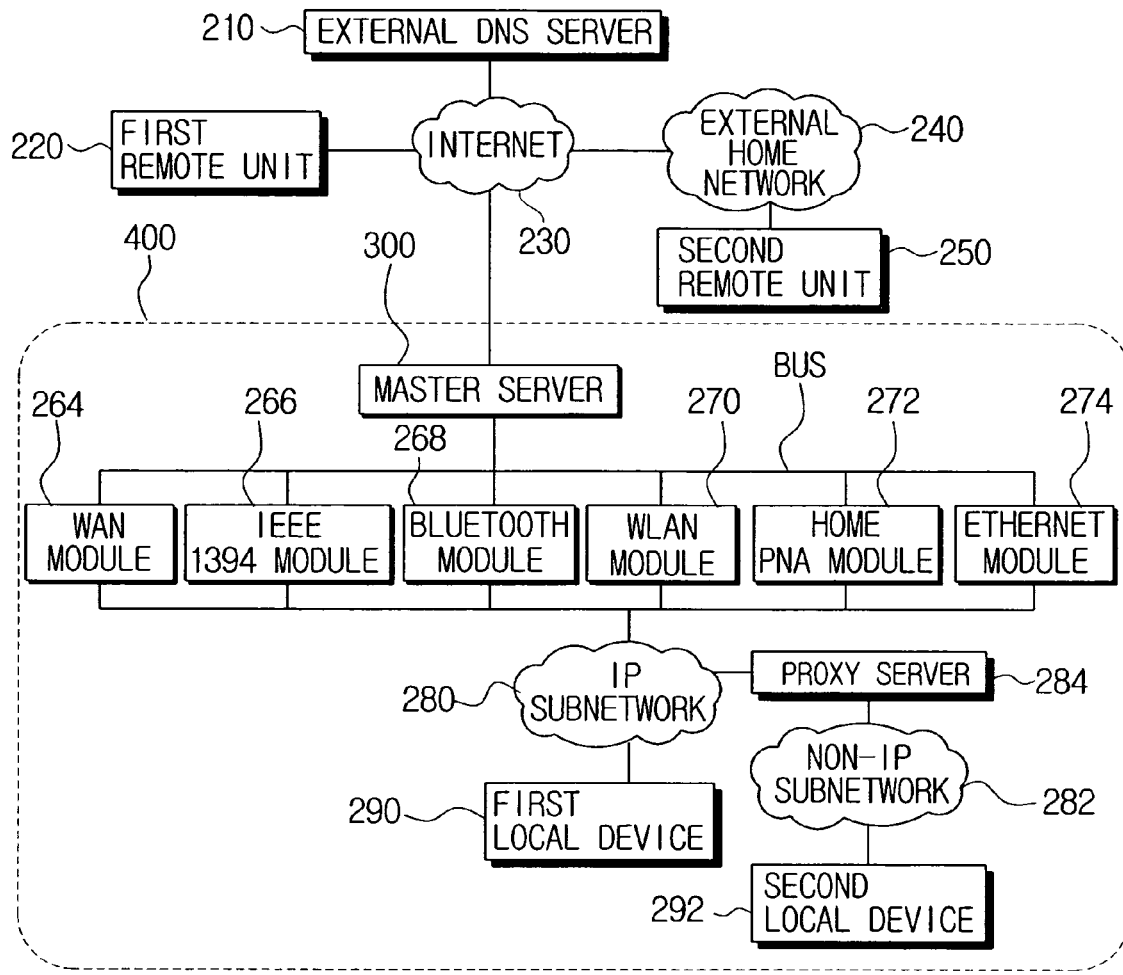
FIG. 2 is a view for showing a home network structure having a unit for managing device information through networks according to an embodiment of the present invention.

FIG. 2 is a view for showing a home network structure having a unit for managing device information through networks according to an embodiment of the present invention.

Referring to FIG. 2, an entire network consists of an external network and a home network 400. The external network includes an external DNS server 210 connected to the Internet 230, a first remote unit 220, and an external home network 240. A second remote unit 250 is connected to the external home network 240.

The external DNS server 210 registers and stores an URL of the home network 400 and an authorized IP address currently allocated to the home network 400 from a master server 300 of the home network 400, to thereby enable connections from external devices to the home network 400.

The home network 400 includes the master server 300, a Wide Area Network (WAN) module 264, an IEEE 1394 module 266, a BLUETOOTH module 268, a Wireless Local Area Network (WLAN) module 270, a Home Phoneline Networking Alliance (HomePNA) module 272, and an Ethernet module 274. The individual modules 264 to 274 are connected to the master server 300 through a bus. The WAN module 264, IEEE 1394 module 266, BLUETOOTH module 268, WLAN module 270, HomePNA module 272, and Ethernet module 274 provide ways to receive and send data from and to corresponding devices carrying out communications based on protocols thereof.

The home network 400 has an IP subnetwork 280 and a non-IP subnetwork 282. The IP subnetwork 280 consists of intelligent devices such as a first local device 290, and the non-IP subnetwork 282 consists of non-intelligent devices such as dummy devices like a second local device 292. The dummy devices refer to devices such as bulbs, doors, washing machines, and so on, which do not have control capability in themselves, but simply perform routine operations only. Such a configuration is possible even in a different module.

The TCP/IP is used as a basic protocol inside the home network, and all nodes on a home network are distinguished by IP addresses so that unique nodes are designated in an environment in which plural nodes are connected through a network.

The master server 300 is an entry node enabling the home network 400 to communicate with external networks such as another network 240 and the Internet 230. Therefore, the master server 300 performs translations between private IP addresses assigned to home network devices and authorized IP addresses used for external networks.

The master server 300 processes data flowing in from or out to the modules 264 to 274. Further, the master server 300 manages information on devices of the home network 400, and provides information on registered devices through networks in response to requests for information on devices. Since the master server 300 manages private IP addresses allocated to devices of the home network 400, all the nodes inside a home network can exchange information from one to another regardless of network media interfaces. Moreover, the master server 300 registers an URL of a home network and an authorized IP address currently allocated to the home network into the external DNS server 210 to enable communications between the home network 400 and external networks.

The master server 300 has the Dynamic Host Configuration Protocol (DHCP) (not shown). The DHCP provides unique identifiers, that is, private IP addresses to devices of the home network 400.

A proxy server 284 performs function translating services in the application level in order to transfer services using IP networking to a non-IP node. The proxy server 284 enables devices not supporting the TCP/IP to be allocated with private IP addresses from the DHCP server for the devices (hereinafter, referred to as 'IP devices') connected to the non-IP subnetwork 282 in order to connect the devices not supporting the TCP/IP to the home network.

Further, the proxy server 284 grasps non-IP node states. That is, the proxy server 284 manages state information such as whether non-IP nodes are powered on or inserted into the home network. Moreover, the proxy server 284 manages private IP addresses assigned from non-IP devices, and manages information on relations between private IP addresses and hardware addresses of plural non-IP devices. The proxy server 284 can be separately provided from the master server 300, or the master server 300 can perform proxy server functions.

A device of a home network is defined as a service client if the device requests a connection to other devices, and as a service server if the device provides a connection to other devices when requested for the connection by the other devices. The service server waits for a request from a service client, opening an access point that the server itself provides all the time, and is connected when there is a request from a service client.

Devices connected to a home network can be service servers or service clients depending upon whether connections are requested or provided. This is because it is determined whether the devices of a home network are used as service clients or as service servers depending upon operation states thereof. That is, if a device connects to the DHCP and requests a private IP address allocation, the device operates as a service client, and the DHCP operates as a service server. However, the device operates as a service server when providing its operations upon a request of a different device.

There is a direct interface and an indirect interface for the interfaces for a service server and a service client. Here, the direct interface refers to a way that a service server and a service client directly give and take data units through an IP networking path, and the indirect interface refers to a way that a service server and a service client give and take data units through a proxy server 284 therebetween when the service server is a non-IP node.

Figure 3:
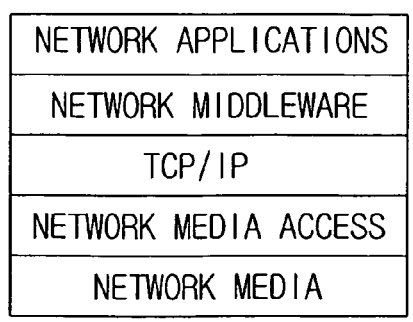
FIG. 3 is a view for showing a protocol stack for a home network using a middleware.

FIG. 3 is a view for showing a protocol stack for a home network using a middleware.

The middleware refers to software for communications among devices belonging to different categories, which enables communications among various devices in a home network. The middleware is deployed between an operating system and application programs, and transparently connects distributed applications and distributed data in a client/server environment. Further, the middleware is software independently connecting to hardware in a network in order to support diverse communication protocols, system structures, operating systems, databases, and application programs. Such middleware is based on a TCP/IP backbone network, and operates with a separate translation device with respect to other protocol stacks such as a User Datagram Protocol (UDP) and the like.

Figure 4:
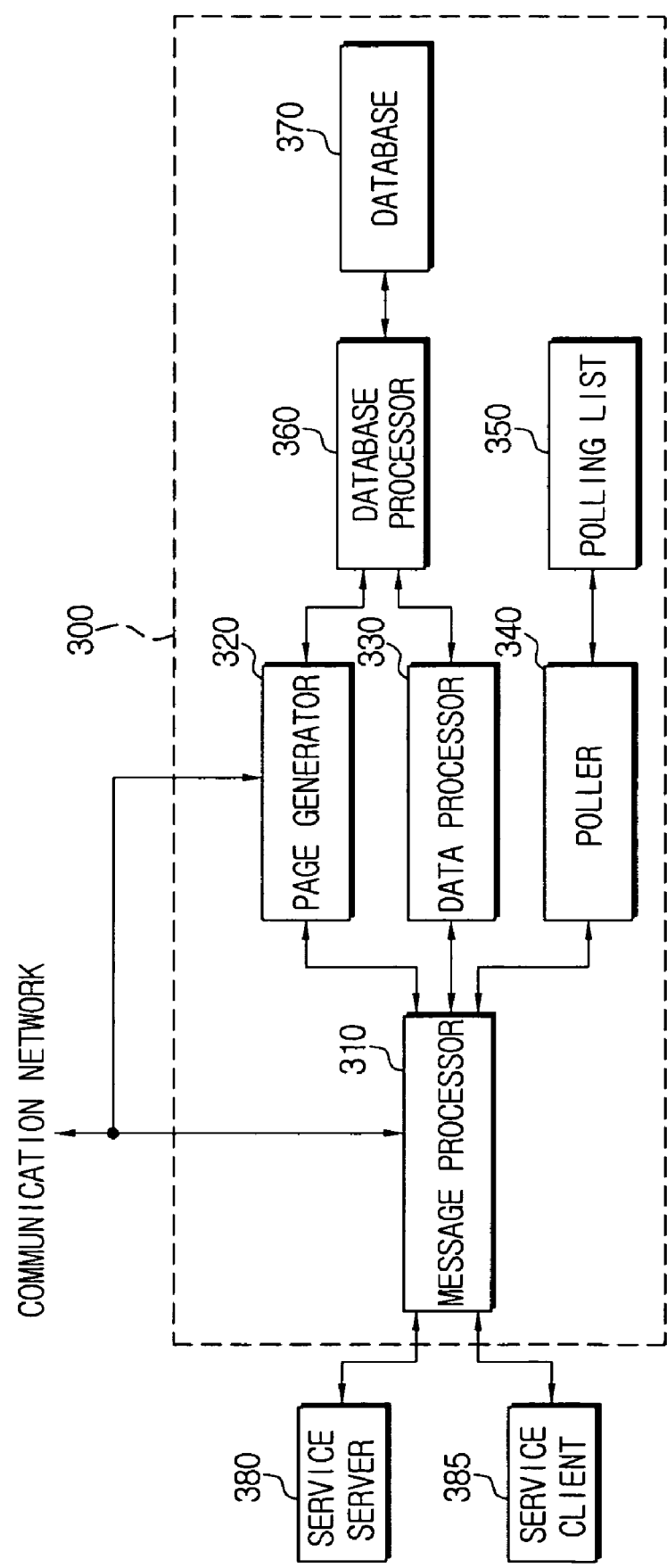
FIG. 4 is a block diagram for showing an internal structure of a unit for managing device information through a network according to an embodiment of the present invention.

FIG. 4 is a block diagram for showing an internal structure of an apparatus for managing device information through networks according to an embodiment of the present invention. The present embodiment is described with an exemplary situation in that the master server 300 functions as an apparatus for providing device information through networks, but a remote service management apparatus can be provided which is separate from the master server 300.

Referring to FIG. 4, the master server 300 has a message processor 310, a page generator 320, a data processor 330, a poller 340, a polling list 350, a database processor 360, and a database 370.

The message processor 310 processes messages received or sent to or from the master server 300. The message processor 310 is connected with a service server 380 and a service client 385. The operations and structures of the service server 380 and the service client 385 are the same as described above, so detailed descriptions therefor are omitted.

The message processor 310 performs a registration function for home devices existing on the home network 400 and a polling function for monitoring active states and the like on accessible devices.

The message processor 310, when receiving a registration request message from a home device, translates device information and polling information on the home device that are included in the received registration request message according to a data structure managing home information, and registers the translations in the polling list 350 and the database 370. At this time, the message processor 310 also registers additional information on a corresponding device provided from the data processor 330 upon the registration of basic information. The registration request message can be written in the Extensible Markup Language (XML) format or the like, and the registration request message includes basic information on a corresponding device, a service list, device information on state variable list, polling intervals, and polling information including an allocated device ID, and so on. The basic information includes an IP address of a corresponding device, the kind (for example, device type, serial number, manufacturer, model, and so on), and so on.

Further, the registration request message includes a service interface set for services that the corresponding device provides. The message processor 310 can provide a user with information on functions of the corresponding device by using the service interface set, and can execute a remote call by using location information on functions included in an interface upon executing a service having such functions.

In the meantime, the state variable list is also registered upon registering information on home devices. The state variable list includes all the information on state information necessary for the corresponding device. The message processor 310 refers to the state variable list, links state variable locations to which services are provided, and maintains relations of state variables related to the services. The state variables have a close relation with an event message. At this time, the state variables that are not real-valued are related to the event message. That is, the message processor 310 requests corresponding device values by using location information in case that real values are necessary.

The page generator 320, in response to an information request of a device having a user interface on the home network 400 or the Internet 230, dynamically generates and provides updated information with reference to data stored in the database 370. In here, the term "dynamically" means generating data of a new format rather than a fixed format by processing data as a logical reference. The page generator 320 generates information in a web document format. Such a page generator 320 operates as a web server with respect to a message requested through the Internet 230.

The data processor 330 provides additional information on devices such as device location information, device identification name in a home network, and so on. The additional information is sent from a user when devices are registered. When no additional information is sent from a user, the data processor 330 produces and manages the additional information. The data processor 330 can use device location information and identification name to carry out DNS server functions. The device kinds included in the basic device information mean categories to which devices belong, such as Digital Versatile Disk Player (DVDP), High Definition Television (HDTV), and the like. On the other hand, the identification name means a unique code or alias for identifying each device in a network.

The database processor 360 processes transactions on data stored in the database 370. The data structure stored in the database 370 can be configured in XML, so the database processor 360 includes an XML parser. Further, the data processor 360 provides an interface to enable queries to be processed in use of the parser in order to access data during transactions occurring between the page generator 320 and the data processor 330.

The database 370 stores characteristics information, additional information, and so on, about devices existing on the home network 400. The data stored in the database 370 can be managed in the XML in order to facilitate connections to the Internet, maintain semantics, and cope with queries in diverse expressions.

The poller 340 carries out functions for monitoring connection states of home devices. The poller 340 checks the polling list 350 at certain polling intervals, and sends and provides to the message processor 310 a polling list listing devices that polling is required. If a difference between a current time and a last polling time is larger than a polling period of time in a data structure of the polling list 350, the poller 340 sends out a polling message, and changes the last polling time to the current time. Further, the poller 340 receives device state information from the message processor 310, and adds or deletes records of corresponding devices from the polling list 350.

The polling list 350 stores polling information such as device IP addresses, polling intervals, last polling times, and so on, for every device. The polling information stored in the polling list 350 is used to manage polling intervals different from device to device.

Figure 5:
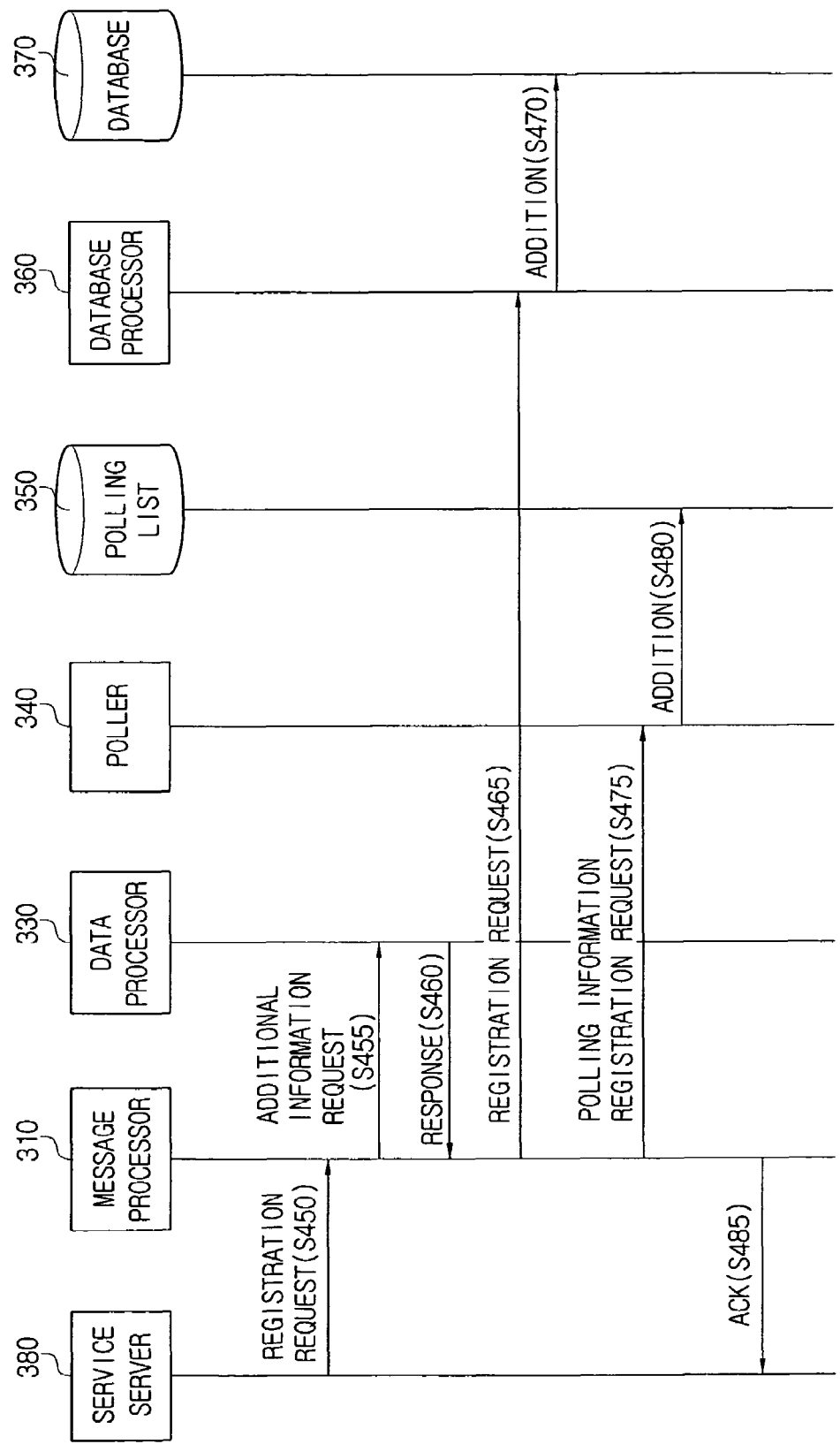
FIG. 5 is a view for showing a message sequence chart for a process registering device information into a database.

FIG. 5 is a view for showing a message sequence chart for a process registering device information into a database.

Referring to FIG. 5, the service server 380 requests a registration to the message processor 310 (S450). A registration request message sent to the message processor 310 from the service server 380 upon the registration request includes characteristics information on device kind, manufacturer, and so on, and polling information suitable for a device to be connected. The message processor 310 requests additional information on devices to the data processor 330 (S455). With respect to the request, the data processor 330 provides the additional information to the message processor 310 (S460). At this time, the data processor 330 displays an additional information input view on a home browser and inputs from a user the additional information such as location information, for example, master room, living room, and kitchen, on a corresponding device, and unique names such as VCR1, VCR2, and so on, in a home network. If there is no input from a user, the data processor 330 generates default values to produce additional information. The message processor 310 transforms into a database schema and then sends to the database processor 360 the characteristics information and the additional information on a device requesting a registration (S465). The database processor 360 registers the received characteristics information and additional information in the database 370 (S470).

Together with this, the message processor 310 sends to the poller 340 polling information including an IP assigned to a home device, a polling interval, and a last polling time, and requests a registration (S475), and the poller 340 adds the received polling information to the polling list 350 (S480). If the above operation has ended, the message processor 310 transmits an ACK signal to the service server 380 (S485).

Figure 6:
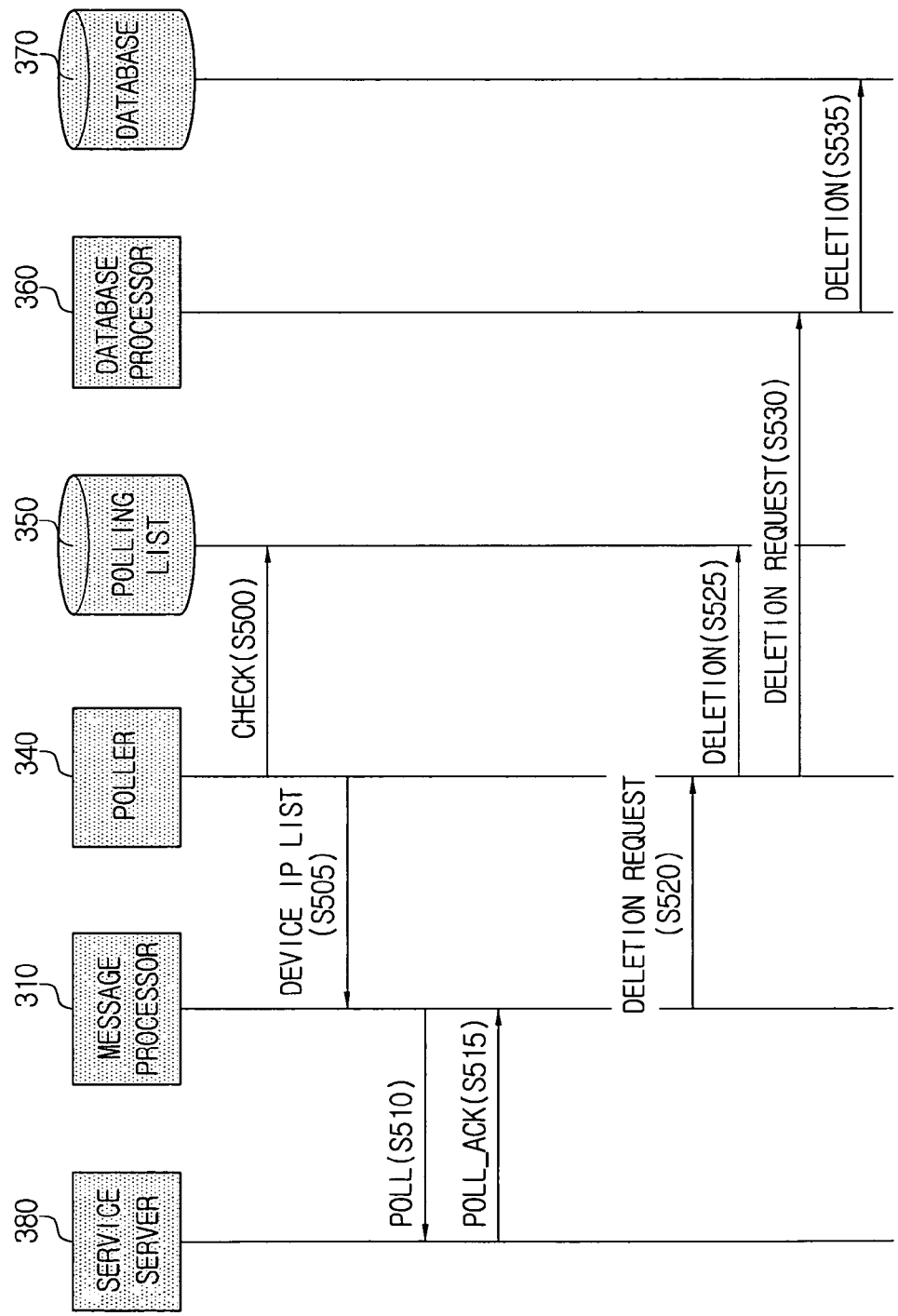
FIG. 6 is a view for showing a message sequence chart for a process carrying out monitoring functions over devices connected to a home network.

FIG. 6 is a view for showing a message sequence chart for a process carrying out monitoring functions over devices connected to a home network.

Referring to FIG. 6, the poller 340 checks the polling list 350 (S500), and provides to the message processor 310 a polling list listing devices that polling is required (S505). The message processor 310 sends out a polling message in order to check a connection state of a corresponding device based on the received polling information (S510). The polling message includes request information on a current state of the corresponding device. The message processor 310 can check whether each device is activated, using the polling message. A device receiving the polling message reads out a response message (S515). The message processor 310, if a normal response to the polling is received, leaves untouched the information on the corresponding device in the polling list 350 and the database 370.

If a normal response is not received, the message processor 310 requests the poller 340 to delete the polling information on the corresponding device (S520), and, accordingly, the poller 340 deletes the polling information on the corresponding device from the polling list 350 (S525). Together with this, the message processor 310 requests the database processor 360 to delete device information on the corresponding device (S530). The database processor 360, accordingly, deletes the device information on the corresponding device from the database 370 (S535).

As described above, the apparatus sends a polling message in a time interval based on the characteristics of each device with reference to the polling information included in a registration request message, rather than evenly sending a polling message to all devices in the same interval, to thereby enable network traffic to be reduced.

Figure 7:
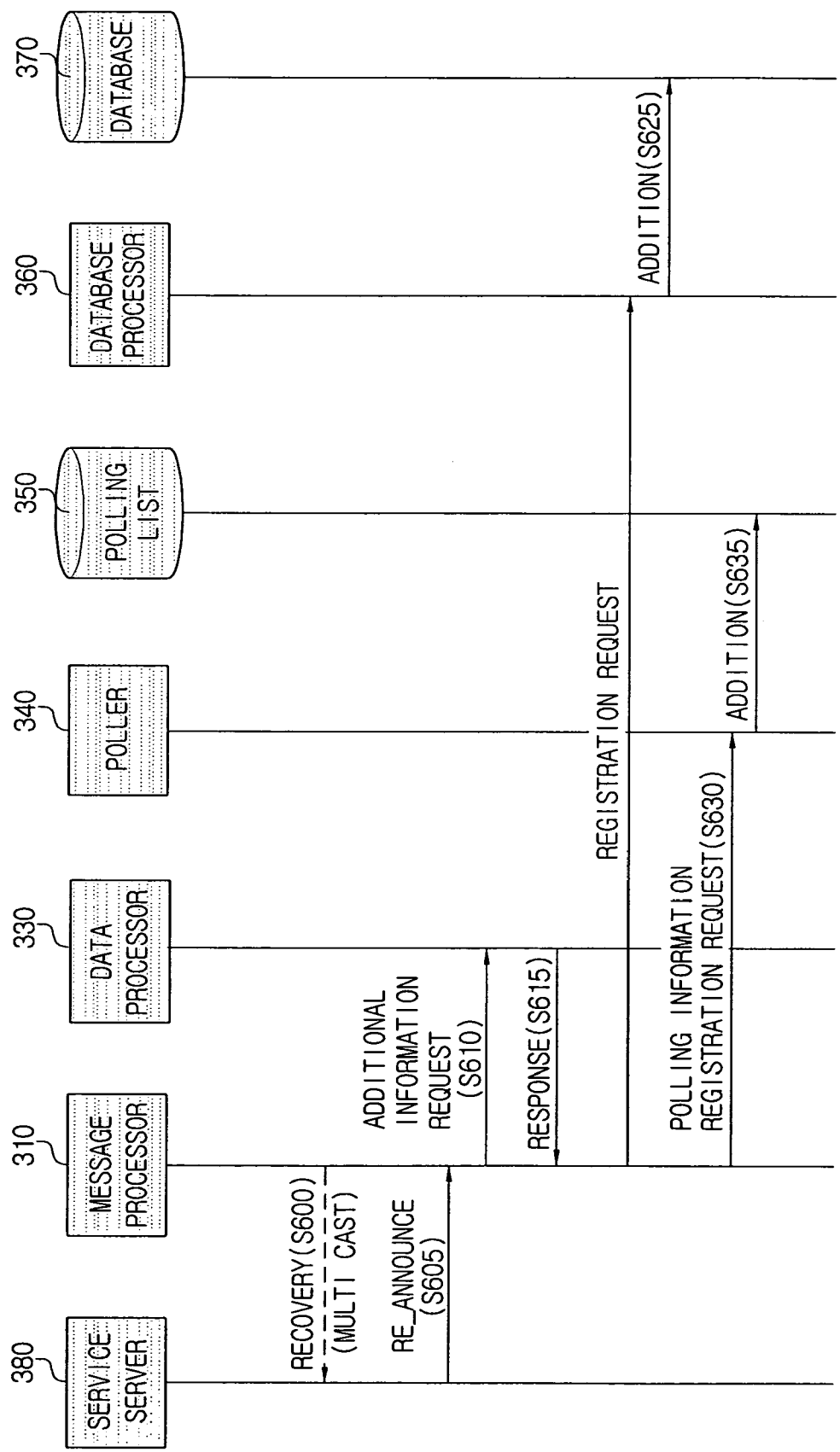
FIG. 7 is a view for showing a message sequence chart for a process registering device information into a database after a master server starts up.

FIG. 7 is a view for showing a message sequence chart for a process registering devices existing on a home network after a master server starts up.

Referring to FIG. 7, the message processor 310 multicasts a recovery message (S600), and all the home devices receiving a multicast signal from the message processor 310 send out a re-registration signal. Since device information stored in the database 370 is volatile data, no device information exists at the time the master server 300 starts up. Accordingly, since a home device having a connectible state has to re-register its information, the message processor 310 sends out a recovery message to all the devices in a multicast scheme.

A process after the sending of a recovery message is equal to the process for the registration. That is, the message processor 310 requests additional registration information on devices to the data processor 330 (S610). In response to this, the data processor 330 provides the additional information to the message processor 310 (S615). The message processor 310 transforms into a database schema and sends out to the database processor 360 the characteristics information and the additional information on the devices requesting the registrations (S620). The database processor 360 registers the device information such as the received characteristics information and the additional information, and so on, to the database 370 (S625).

Along with this, the message processor 310 adds polling information to the polling list 350 through the poller 340 (S630 and S635).

Figure 8:
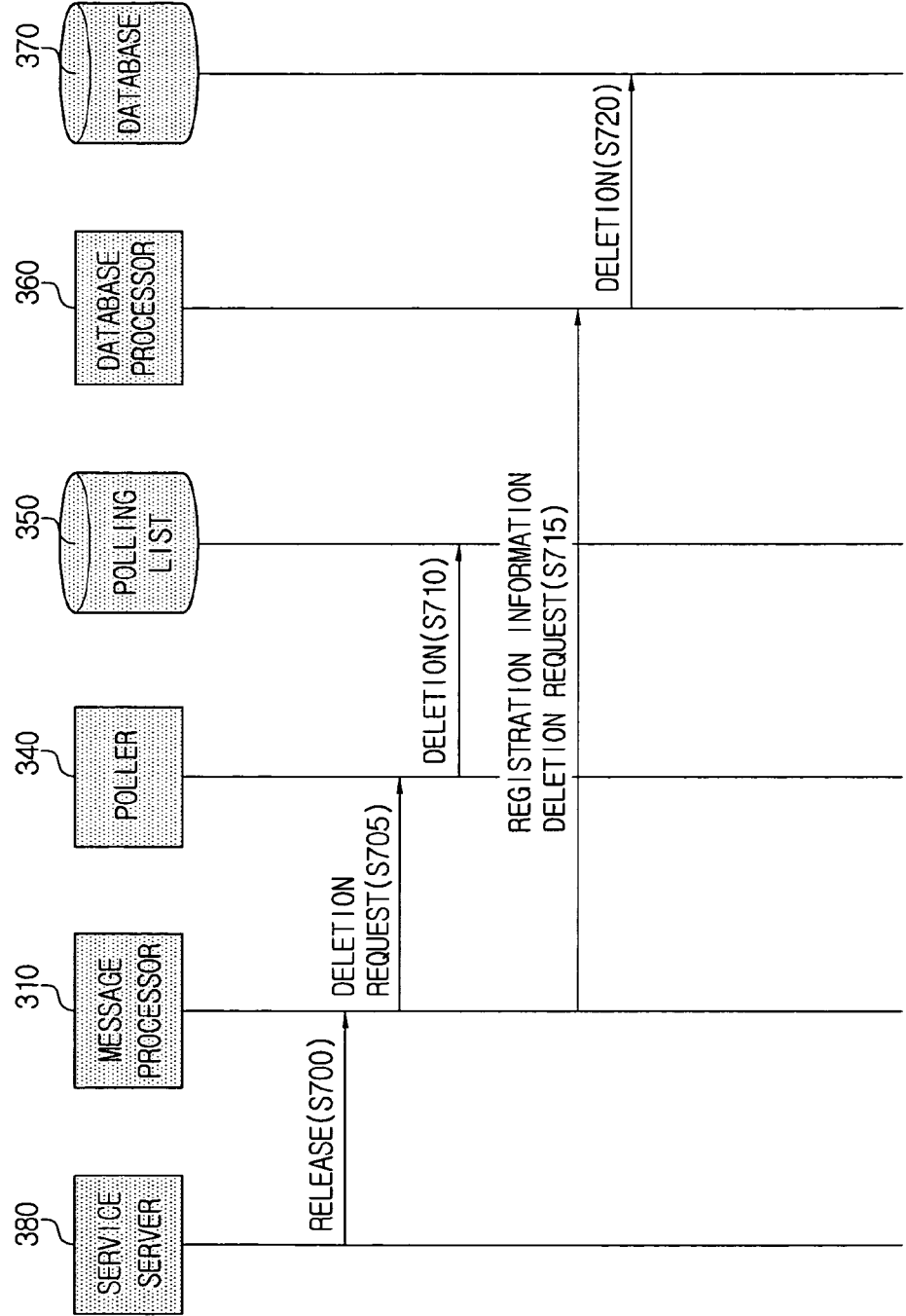
FIG. 8 is a view for showing a message sequence chart for a process normally terminating connections of devices connected to a home network.

FIG. 8 is a view for showing a message sequence chart for a process normally terminating connections of devices connected to a home network.

The message processor 310, if a release message is received from the service server 380, requests the poller 340 to delete polling information on a corresponding device (S705), and the poller 340 deletes a record of the corresponding device from the polling list 350 (S710).

Further, the message processor 310 requests the database processor to delete device information on the corresponding device (S715), and, accordingly, the database processor 360 deletes the corresponding device information from the database 370 (S720).

Figure 9:
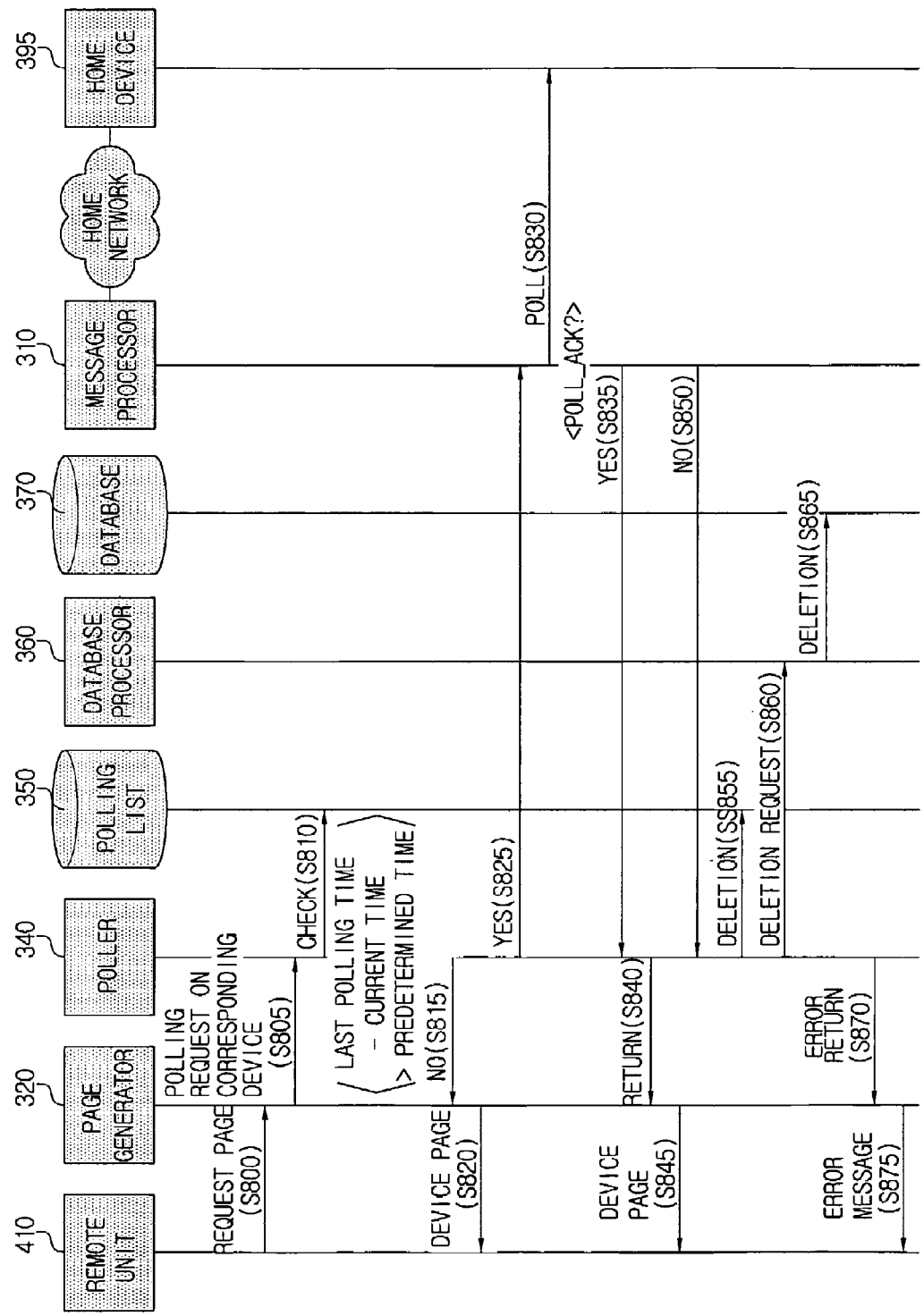
FIG. 9 is a view for showing a message sequence chart for a process providing information on devices existing on a home network to a remote unit connected to the home network.

FIG. 9 is a view for showing a message sequence chart for a processor providing information on devices existing on a home network from a remote unit connected to the home network Referring to FIG. 9, a user requests information on devices existing on the home network 400 by using a user interface such as a web browser installed in the remote unit 410 (S800). In this step, the master server 300 can execute an authentication process for the connected user. In this case, each remote user can be assigned as access authority with a different accessible range. For example, a specific user can be allowed to access only devices in the master room. Information related to a user authentication is stored in the database 370, and a user authentication process is executed in a separate user authentication unit (not shown).

Referring to FIG. 9, the page generator 320 inquires of the poller 340 whether it is necessary to send out a polling message to a corresponding device (S805). Accordingly, the poller 340 checks the polling list 350, reads out polling information on the corresponding device, and decides whether a difference between the last polling time and the current time is larger than a predetermined time. If the difference between the last polling time and the current time is smaller than the predetermined time as a result of the decision, the poller 340 notifies the page generator 320 that there is no need to send out a polling message (S815). Accordingly, the page generator 320 provides device information on the corresponding device in a web page format (S820).

If the difference between the last polling time and the current time is larger than a predetermined time, the poller 340 requests the message processor 310 to send out a polling message (S825). Accordingly, the message processor 310 sends out a polling message (S830). If a response message of the corresponding device with respect to the polling message is normal (S835), the page generator 320 sends out the device information on the corresponding device (S845), and, if there is no response (S850), as aforementioned, the database processor 360 deletes the corresponding device information and polling information (S855, S860, and S865). In this case, the message processor 310 sends out an error message to the remote unit 410 (S870 and S875). Through such a process, device information on the corresponding device is maintained reliable.

As described above, the present invention can provide information on devices existing on a home network through a separate unit rather than each device, and enable developments of intelligent network services such as remote controls and remote managements through the network. Further, the present invention uses different polling intervals with respect to devices existing on a home network, to thereby improve the reliability of device information and reduce network traffic.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. An apparatus for managing device information through networks, comprising:
    a polling list apparatus for storing polling information including device Internet Protocol (IP) addresses assigned to home devices, polling intervals, and last polling times;
    a poller for checking the polling list apparatus and sending out a polling list listing first devices of the home devices to be polled; and
    a message processor for generating a polling message based on received registration request messages from the home devices, sending out the polling message verifying whether a corresponding device of the first devices is activated with reference to the polling list, and updating the polling information stored in the polling list apparatus based on a response message with respect to the polling message received from the corresponding device.

2. The apparatus as claimed in claim 1, wherein the message processor further generates device information including at least one of basic information on the home devices, a service list, and a state variable list, based on the registration request messages, and updates the device information based on the response message to the polling message.

3. The apparatus as claimed in claim 2, further comprising:
    a database for databasing and storing the device information;
    a database processor for performing transactions on the device information stored in the database; and
    a page generator for generating and providing to the message processor the device information in a web page format based on the device information received from the database processor in response to information requests on the home devices.

4. The apparatus as claimed in claim 3, wherein the page generator generates the device information in the web page format when there is no need to send out the polling message with respect to the corresponding device in response to the information requests and when the response message of the corresponding device in response to the polling message is normal.

5. The apparatus as claimed in claim 4, wherein, when a difference between a last polling time and an information request time with respect to the corresponding device is smaller than a predetermined time, there is no need to send out the polling message.

6. The apparatus as claimed in claim 3, further comprising a data processor for receiving and providing to the message processor additional information including at least one of location information on the home devices and identification information, wherein the message processor requests the data processor to provide the additional information if the message processor receives the registration request message from the home devices.

7. The apparatus as claimed in claim 3, wherein the message processor multicasts a multicast message requesting the home devices to send out the registration request messages at an initial operation.

8. The apparatus as claimed in claim 3, wherein the message processor, when receiving a connection termination message from one of the home devices, requests the poller and the database processor to delete the polling information and the device information on the one of the home devices.

9. The apparatus as claimed in claim 1, wherein the device information includes device kind information comprising at least one of a device type, a serial number, a manufacturer, and a device IP address assigned to the home devices.

10. A method for managing device information through networks, comprising:
    generating polling information including device Internet Protocol (IP) addresses assigned to home devices, polling intervals, and last polling times based on registration request messages received from the home devices;
    storing the polling information;
    checking a polling list apparatus and sending out a polling list listing first devices of the home devices to be polled; and
    sending out a polling message verifying whether a corresponding device of the first devices is activated with reference to the polling list, and updating the polling information stored in the polling list apparatus based on a response message received from the corresponding device with respect to the polling message.

11. The method as claimed in claim 10, further comprising:
    generating the device information including at least one of basic information on the home devices, a service list, and a state variable list, based on the registration request messages; and
    updating the device information based on the response message to the polling message.

12. The method as claimed in claim 11, further comprising:
    databasing and storing the device information;
    performing transactions on the device information stored in the database; and
    generating and providing the device information in a web page format based on the device information received from the operation of performing the transactions in response to information requests on the home devices.

13. The method as claimed in claim 12, wherein the operation of generating the device information in the web format generates the device information in the web page format, when there is no need to send out the polling message with respect to the corresponding device in response to the information requests and when the response message of the corresponding device in response to the polling message is normal.

14. The method as claimed in claim 13, wherein, when a difference between a last polling time and an information request time with respect to the corresponding device is smaller than a predetermined time, there is no need to send out the polling message.

15. The method as claimed in claim 12, further comprising:
   receiving and providing additional information including at least one of location information on the home devices and identification information from a user upon registering the home devices; and
   requesting the operation of providing the additional information if the registration request message is received from the home devices.

16. The method as claimed in claim 12, further comprising multicasting a multicast message requesting the home devices to send out the registration request messages at an initial operation.

17. The method as claimed in claim 12, further comprising deleting the polling information and the device information on one of the home devices when receiving a connection termination message from the one of the home devices.

18. The method as claimed in claim 10, wherein the device information comprises device kind information having at least one of a device type, a serial number, and a manufacturer, and device IP addresses assigned to the home devices.

* * * * *